US006378556B1

United States Patent
Fondse

(10) Patent No.: US 6,378,556 B1
(45) Date of Patent: Apr. 30, 2002

(54) MULTIWAY VALVE

(75) Inventor: Jan Hendrik Fondse, Diever (NL)

(73) Assignees: Fondse Valves B.V.; Frans Lodewijk Rijinberg, both of Voorburg (NL)

( * ) Notice: Subject to any disclaimer, the term of this patent is extended or adjusted under 35 U.S.C. 154(b) by 0 days.

(21) Appl. No.: 09/611,516

(22) Filed: Jul. 7, 2000

Related U.S. Application Data

(63) Continuation of application No. PCT/NL99/00008, filed on Jan. 8, 1999.

(30) Foreign Application Priority Data

| Jan. 8, 1998 | (NL) | ............................................. 1007984 |
| Mar. 25, 1998 | (NL) | ............................................. 1008703 |

(51) Int. Cl.⁷ ............................................. F16K 11/06
(52) U.S. Cl. .................. 137/625.48; 137/625; 137/597; 251/65; 251/129.01
(58) Field of Search ............................. 251/65, 129.01; 137/625, 597, 625.48

(56) References Cited

U.S. PATENT DOCUMENTS

| 3,587,650 A | * | 6/1971 | Denker .............. 137/625.48 X |
| 4,621,660 A | * | 11/1986 | Klocke .................. 137/625.44 |
| 4,783,050 A | * | 11/1988 | Hugler .............. 137/625.48 X |
| 4,838,312 A | * | 6/1989 | Berchem et al. ....... 137/625.48 |
| 5,146,126 A | * | 9/1992 | Hutchins ........... 251/129.11 X |
| 5,388,614 A | * | 2/1995 | Hakamada et al. .... 137/625.65 |

FOREIGN PATENT DOCUMENTS

| DE | 21 40 484 A | 2/1973 |

* cited by examiner

Primary Examiner—John Rivell
Assistant Examiner—Meredith H. Schoenfeld
(74) Attorney, Agent, or Firm—Strook & Strook & Lavan LLP

(57) ABSTRACT

A description is given of a multiway valve, comprising a chamber, limited by two plane-parallel surfaces, into which chamber at least three feed or discharge ducts open out, the state of being open or closed of the ducts being affected by the positioning of a member comprising a permanent magnet, which member is moveable in two dimensions, accommodated inside the chamber, and which member can be made to interact in a sealing manner with one or more duct openings, and magnet actuating assemblies which are disposed stationarily around the chamber and comprise electromagnets with a soft iron core, which assemblies are designed to generate a magnetic field which attracts or repels the member for moving the member inside the housing.

17 Claims, 13 Drawing Sheets

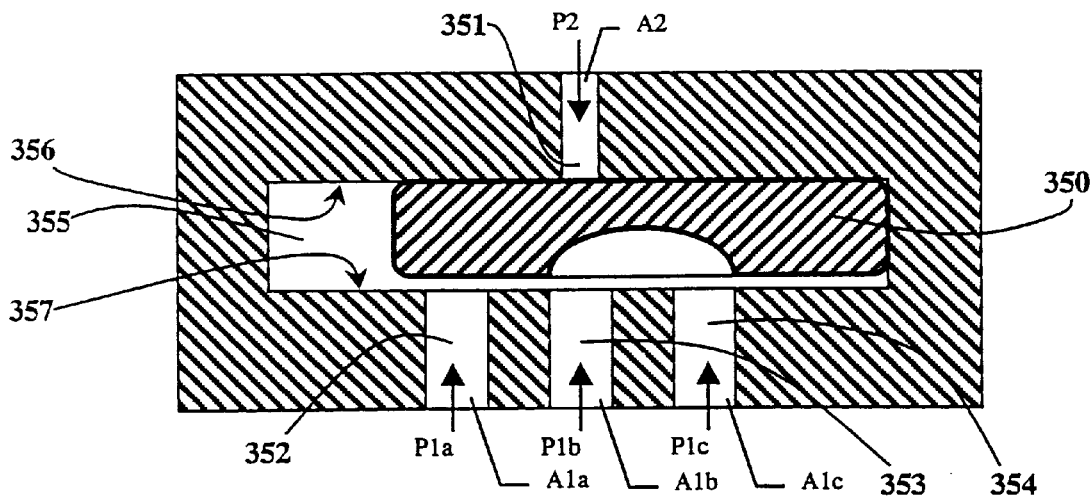
*fig 3G.*   P2 ⋅ A2 < ⋅ (P1 ⋅ A1)
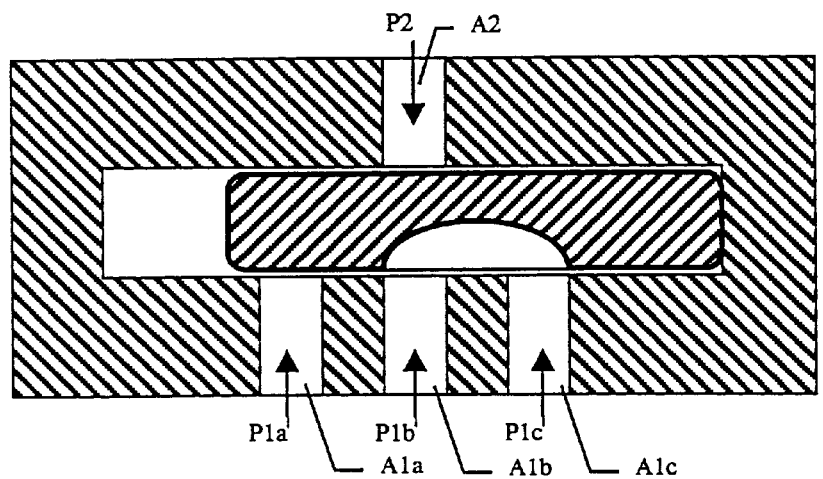
*fig 3H.*   P2 ⋅ A2 = ⋅ (P1 ⋅ A1)
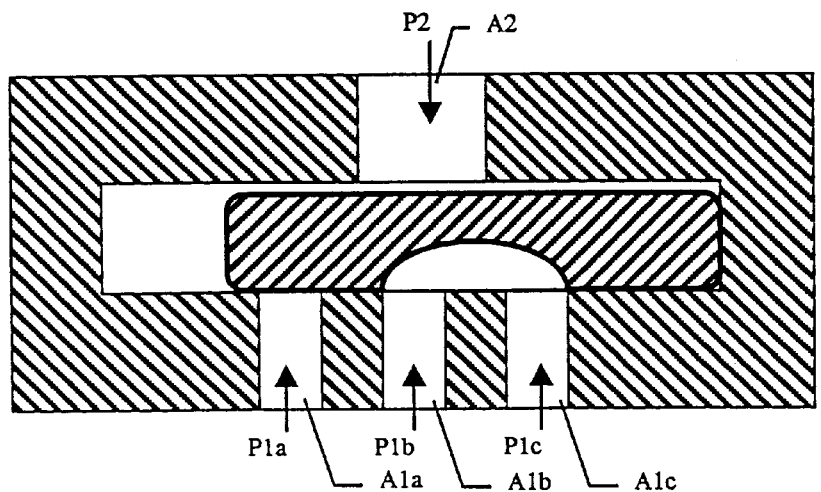
*fig 3I.*   P2 ⋅ A2 > ⋅ (P1 ⋅ A1)

Cross section C-C

Cross section A-A

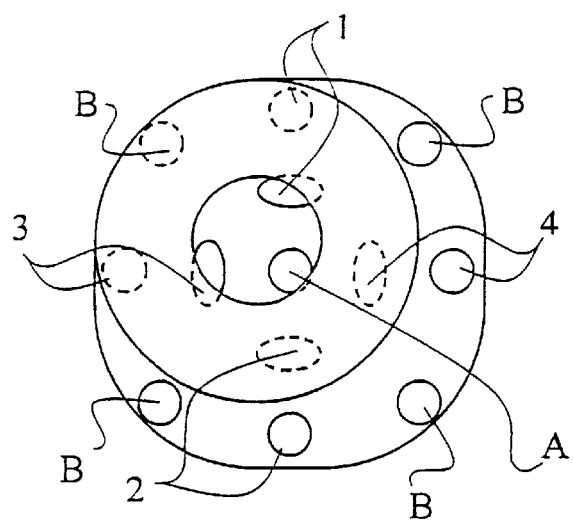
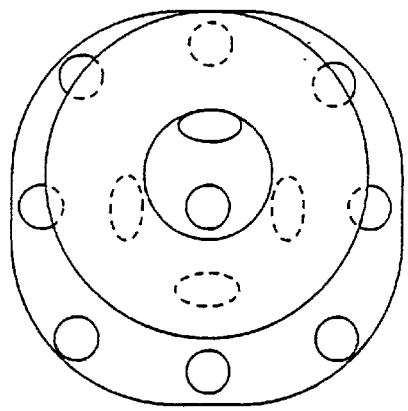
*fig. 12.2*  *fig. 12.3*
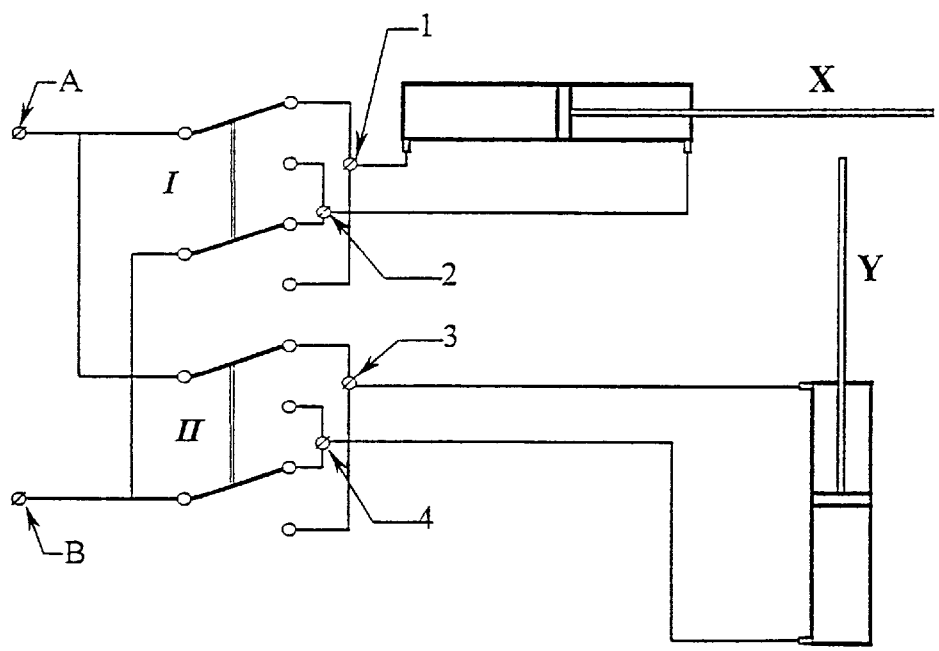
*fig. 12.1*

MULTIWAY VALVE

CROSS-REFERENCE TO RELATED APPLICATIONS

This is a continuation of PCT/NL99/00008, filed on Jan. 8, 1999.

FIELD OF THE INVENTION

The invention relates-to a multiway valve, comprising a chamber being delimited by at least two substantially plane-parallel surfaces, into which at least three feed or discharge ducts open out, the state of being open or closed of the ducts being affected by the positioning of a member, which member is accommodated inside the chamber in such a manner that it is moveable in two dimensions in a plane which runs parallel to the plane-parallel surfaces, the member being flattened on two sides, the said flat sides of the member interacting in a sealing manner with the plane-parallel surfaces by means of surface contact, and which member can be made to interact in a sealing manner with one or more duct openings, and control means for moving the member inside the housing.

BACKGROUND OF THE INVENTION

A multiway valve of this kind is suitable for controlling, metering and mixing fluid flows through multiple feed or discharge ducts, and is known from DE-A-2 140 484. However, a plurality of pull and push rods are arranged around the chamber, penetrating the chamber in order to move the member.

SUMMARY OF THE INVENTION

The invention intends to improve the valve of the prior art, and is characterized in that the member comprises a permanent magnet and the control means comprise a plurality of magnet-actuating assemblies which are disposed stationarily around the chamber and comprise electromagnets with a soft iron core, which assemblies are designed to generate a magnetic field which attracts or repels the member.

As a result, there is no need for any mechanical connection between the control means and the member, providing a multiway valve which is virtually maintenance-free and is scarcely susceptible to wear.

Preferably, the control means of the multiway valve according to the present invention comprise a plurality of units which are disposed radially around the chamber and at substantially equal angles with respect to the centre of the chamber. An arrangement of this nature allows the member to be moved via uniform transmission of force and accurate control.

Preferably, the member is controlled in such a manner that its position is changed via a substantially rectilinear movement.

The magnetic field lines of the permanent magnet are advantageously directed substantially in the same direction as those which can be generated by the magnet-actuating assemblies.

By energizing an electromagnet with a resultant magnetic polarity which is oppositely directed to that of the permanent magnet of the member, the member will be attracted by the electromagnet. Due to the fact that the member comprises a permanent magnet, this magnet will attract the two pole shoes of the electromagnet; depending on the magnetic strength selected for the permanent magnet and the position of the pole shoes, the member can be held in the position obtained by the attraction by the energized electromagnet. Thus, the electromagnet in question can be switched off after a short energizing pulse, and then the member maintains its adopted position due to its own magnetism. As soon as the member is to adopt a different position inside the chamber, a different electromagnet can also be energized with a short pulse, so that the member will be attracted by this electromagnet and its position will be changed accordingly. The member will again continue to hold its newly adopted position. In order to facilitate the displacement of the member, the polarity of the first electromagnet can be reversed. In this way, as a resultant, a force is generated on the member which is directed away from the centre axis of the poles of the electromagnet, resulting in the member being repelled by the said electromagnet. An arrangement of this nature makes it possible to provide a multiway valve which is readily accessible, is extremely energy-efficient, reacts rapidly and reliably and is simple to operate automatically. There are no limits to the possible applications; a multiway valve of any desired dimensions can be used depending on the desired application. The only limitation on the multiway valve when using magnets lies in the limited applications in the case of magnetizable fluids.

In GB-A-2 274 898, a pipeline pig of magnetisable material is described, that can be moved through a pipeline with the aid of electric coils, each wound around a region of the pipeline. At a Y-junction of the pipeline, the pig can be directed into the intended pipe by energizing the particular coil at the said pipe.

DE-A-1 282 402 discloses a two-way magnetic valve, wherein the valve member is magnetic and movable between two poles of a single electromagnet. By reversing the polarity of the magnet, the valve member is moved from the one pole to the other pole of the electromagnet.

In the valve according to the present invention, one or more ducts will be closed off as a function of the position of the member. By changing the position of the member, it is possible to close off different or additional ducts; in addition to complete closure, the member may also be positioned so as to partially close off one or more ducts, resulting in an additional metering function.

By allowing the ducts to open out into the chamber at suitable positions, it is possible to achieve a large number of possibilities for the controlled closure and opening of specific combinations of ducts in order to control, mix and meter various feed streams.

Preferably, the magnet-actuating assembly is positioned in such a manner that the centre axis of the two pole shoes runs inside the chamber, the distance therefrom to the closest transverse wall of the chamber being less than or equal to the shortest distance from the magnetic centre of the member to the said transverse wall. By such a positioning of the magnet-actuating assembly, given a magnetic field generated by the said assembly, a magnetic force is exerted on the member which is directed towards the closest transverse wall. If the multiway valve is designed in such a manner that the member closes off or opens a duct opening in the said position, it is advantageous for the said distance from the centre axis to the closest transverse wall of the chamber to be shorter than the shortest distance from the magnetic centre of the member to the said transverse wall; a constant radial force in the direction of the closest wall is exerted on the member for as long as the member is to remain in the said position, thus ensuring the correct position of the member and the correct function of the multiway valve. If the said distances are equal, the assembly will not exert a radial force on the member and the member will only be held passively in this position.

In the case in which the member closes off a duct opening by direct interaction with a transverse wall of the chamber, in the above-mentioned case the shortest distance from the magnetic centre of the member to the transverse wall will be determined by the diameter and the shape of the member and the position of the magnetic centre therein; however, if the member interacts with a closure body or opening body as described above, the distance is partly determined by the shape and the configuration of this body. Magnetic centre is intended to mean the centre point of the magnetizable material of the member.

If one or more duct openings are incorporated in the transverse walls, it is highly advantageous, in order to achieve optimum immediate closure, if the centre axis through the pole shoes of the magnet-actuating assembly intersects a radial axis of the chamber through the duct opening. In this way, the magnetic force resultant will be directed directly onto the duct opening in question, ensuring successful closure, which is especially advantageous if the multiway valve comprises a plurality of magnet-actuating assemblies which comprise electromagnets with a soft-iron core.

In an attractive embodiment of the multiway valve according to the invention, the field lines of the permanent magnet of the member run radially with respect to the member and the magnet-actuating assemblies are designed to generate a magnetic field whose field lines run substantially parallel through the plane of movement of the member. A magnetic field of this nature will be referred to below as a "parallel magnetic field". In this arrangement, a maximum possible force transmission from the magnet-actuating assemblies to the member becomes possible. This method is illustrated diagrammatically in FIG. 7b.

The member of the multiway valve may also comprise a permanent magnet whose field lines run axially with respect to the member, in which case the magnet-actuating assemblies are designed to generate a magnetic field whose field lines are transverse with respect to the plane of movement of the member. A magnetic field of this nature will be referred to in this application as a "transverse magnetic field". This method is illustrated diagrammatically in FIG. 7a. If desired, the transverse magnetic field may run through a selective area of the chamber, under the influence of which the member can be attracted and consequently can adopt a position inside the chamber which is such that it closes off or opens one or more channel openings. By displacing the transverse magnetic field, the position of the member inside the chamber will be changed accordingly, with the result that, for example, a different duct opening is closed off or opened. Although the force resultant in the direction of movement of the member will be considerably lower in the case of a transversely applied magnetic field compared to a parallel magnetic field, the member can be positioned very accurately within the chamber using the arrangement in which transverse magnetic fields can be generated. In order to generate a transverse magnetic field so as to influence the movement of the member inside the chamber, the magnet-actuating assembly is preferably disposed in such a manner that the centre axis of the pole shoes thereof is at right angles to the centre longitudinal plane of the chamber, the distance from each of the two pole shoes to the said centre longitudinal plane being equal. An arrangement of this nature will cause the magnetic field to be transverse with respect to the plane of movement of the member inside the chamber and will cause the force exerted by one pole shoe on the member to be of the same magnitude as but oppositely directed to the force exerted by the other pole on the member. For this purpose, it is necessary for the magnetically conductive material to be arranged mirror-symmetrically in the member with respect to the plane of the direction of movement of the latter. Thus the sum of these forces, axially with respect to the centre axis of the two pole shoes, is zero, and the resultant of the attraction force on the member is directed towards and radially with respect to the centre axis of the pole shoes. The force resultant thus lies in the plane of movement of the member. Due to this force resultant, the member will move towards the centre axis of the said pole shoes. As soon as the member, or at least the magnetically conductive material thereof, is centred around the centre axis between the pole shoes, the radial force resultant will also be zero.

The possible combinations of a specific fluid feed and a large number of different discharges can be increased by, for example, branching a general feed duct or discharge duct and allowing the branched ducts to open out into the chamber at a distance from one another which is such that at least one of the branched feed openings will be open in any position of the member inside the chamber. Likewise, a plurality of discharge ducts may be joined together integrally in a wall and/or outside the valve downstream of the multiway valve, in order to discharge a large number of combinations of fluids, which can be fed through various ducts, to one or more branches of a common discharge without interruption.

The chamber may have any possible form, such as for example a round chamber in which a spherical member is enclosed virtually without any free space, which sphere can be rotated inside the chamber through two directions of rotation which are perpendicular to one another. Thus the chamber may also have a flattened form, in which case the member is preferably accommodated inside the chamber in such a manner that it is moveable in two dimensions in a plane which runs substantially parallel to the longitudinal axis of the chamber. The member can thus be moved in the length and width directions inside the chamber. The member may preferably adopt any possible position inside the chamber.

The chamber is delimited at least by two substantially plane-parallel surfaces, the plane in which the member can move being parallel to the plane-parallel surfaces.

Both surfaces are preferably connected by side walls, resulting in a closed chamber. An "open" chamber, in which one or more side walls are discontinuous, is also possible, however; in this case, the member has to interact with the chamber walls in such a manner that it is impossible for any uncontrolled loss of fluid to occur through the openings. An open structure of this nature may be advantageous by dint of ease of access and inspection possibilities.

The ducts may open out into the chamber in such a manner that the direction of movement of the member is substantially perpendicular to the fluid feed or discharge direction, for example by allowing the ducts to open out into one of the plane-parallel surfaces. This means that relatively low levels of force are required to change the position of the member inside the chamber.

The member is flattened on two sides in order to ensure satisfactory sealing of the ducts which are arranged in the plane-parallel surfaces and open out into the chamber. It is also possible, in this way, to obtain sealed interaction with both the top and bottom sides of the chamber, which is important, for example, in the case of the above-mentioned "open" structure of the chamber.

The member may be made, for example, from metal, plastic or a ceramic material, although other materials may also be suitable, as long as the above-mentioned seal is effectively provided.

In a preferred embodiment, the member comprises, at least at the location of one of the flattened sides, a cavity which is delimited by the top or bottom surface of the chamber which interacts with the said side of the member, into which surface a central duct opens out, which opening is in communication with the member cavity, irrespective of the position of the member in the chamber.

By designing the member in such a manner that it defines a cavity, this cavity may itself function as a chamber in order to place two or more ducts in communication with one another. By dimensioning the chamber in such a manner that the cavity is in communication with one or more ducts to a certain extent at various positions of the member inside the chamber, it is possible to use the said duct as a central feed or discharge, so that this flow is controlled and/or mixed. The member may then be positioned in such a manner inside the chamber that the said central duct is in communication, via the member cavity, with one or more other ducts, it being possible, by moving the member, to interrupt a connection to a greater or lesser extent and/or to bring about a connection to one or more other ducts to a greater or lesser extent. Obviously, it is also possible to close off the other ducts, whether or not together with the central duct, depending on the position of the duct openings in the chamber, the shape of the member cavity and the position of the member. The member preferably comprises a continuous ring section which interacts in a sealing manner with at least one of the plane-parallel surfaces, the member cavity being delimited in the radial direction by the inner circumference of the ring section. This provides a substantially round cavity, allowing a large number of connection combinations between feed and discharge ducts by means of relatively simple movements of the member.

Advantageously, the member cavity is in communication with both the top and bottom sides of the chamber. As a result, it is also possible, via the member cavity, to place ducts which each open out at opposite plane-parallel surfaces of the chamber in communication with one another. This allows the valve to be of compact design and reduces the restriction for the controlled flow. Advantageously, the inner walls of the cavity in the member are designed to be convex, thus reducing turbulence in the fluid flow.

Advantageously, cavities are formed on both the bottom and top sides of the member, in which case the two cavities are not in communication with one another, so that the two separate fluid flows can be controlled simultaneously with very reliable control of the two flows in identical directions and volumes.

Advantageously, a central cavity is made on the top side of the member and a concentric annular cavity is made on the bottom side, the two cavities not being in communication with one another, so that two fluid flows can be controlled simultaneously, ensuring with great reliability that the control of one flow is the inverse of the control of the other flow.

Obviously, it is possible, in a similar manner, to make a plurality of concentric cavities in the member, resulting in a large number of possible connection combinations. A few examples are illustrated in FIG. 8. The control of all these combinations is linked to the position and shape of the member.

The degree of freedom in the number of possible connection combinations can, furthermore, be expanded by a further embodiment of the invention in which the member comprises at least two continuous ring components which are arranged on top of one another and each interact in a sealing manner with a plane-parallel surface and with one another by means of surface contact, which ring components, independently of one another, can be moved with respect to the plane-parallel surfaces, the spaces inside the continuous ring components being in communication with one another and defining the member cavity. By arranging the member in the form of a plurality of ring components which are arranged on top of one another, such as continuous annular discs, it is possible to obtain a multiplicity of possible connection combinations if the relevant ducts are arranged in both the top and bottom sides of the chamber. For example, if the member comprises two continuous annular discs and a plurality of ducts in mutually opposite plane-parallel surfaces, it is possible to connect together one or more duct openings which open out into the same surface or into an opposite plane-parallel surface (or can be closed off from one another). It is important, for the effect mentioned above, for it to be possible to place the space defined within one ring component in communication with that of the second ring component. The member cavity is thus define by the spaces which are in communication with one another. If desired, the communication between the two spaces may be interrupted by sliding the two ring components apart, in order to disconnect certain connection combinations or to form two independent connection circuits. By sliding the two discs sufficiently far over one another, it is possible to combine the said circuits.

In an attractive embodiment, the control means comprise a rod which is guided through a surface delimiting the top side of the chamber and engages on the top side of the member.

In another embodiment of the invention, one of the discs is accommodated rotatably in the chamber and comprises at least one bore which puts the member cavity in commmunication with a side wall or with a plane-parallel surface which interacts with this disc. It is thus unnecessary for both discs to be able to move in two dimensions inside the chamber; by providing one of the discs with a continuous bore and accommodating it rotatably inside the chamber, it is possible to bring about a large number of connection combinations. A rotatable arrangement is regarded as a one-dimensional movement. For this purpose, the bore in the said disc, by rotating the said disc, can be connected to a connected duct which is situated, for example, in a side wall, with the result that this duct can be placed in communication with the member cavity.

By accommodating one or more feed or discharge ducts in the side wall(s) of the chamber, it is possible to increase the number of connection combinations still further. Even if the member does not have any bores or other radial openings allowing these ducts to be connected to the member cavity, the ducts present in the side wall can be either closed off by the member or connected to other ducts which are present in the side wall or in the plane-parallel surfaces. The multiway valve therefore allows two combination circuits: a circuit in which ducts are connected to one another via the member cavity and a second circuit in which ducts which are neither closed off by the member nor in communication with the member cavity are connected to one another.

A duct may advantageously be closed off by the fact that at least a section of a side wall of the member interacts in a sealing manner with the transverse wall(s) of the chamber around a duct opening. However, it is also possible for a separate closure body, which is held in the open position by spring pressure, for example, to be positioned in front of the duct opening in question. The member can thus move the said closure body counter to the spring stress until it interacts in a sealing manner with the duct opening. For example, it is conceivable for there to be configurations in which the duct opening is provided with an opening body which, in a similar manner to that described above, closes off the duct opening, for example by means of spring pressure, it being possible for the member to be made to interact with the opening body, with the result that the duct in question is opened. In a preferred embodiment of the multiway shut-off valve according to the present invention, the member may be made to interact in a sealing manner with one or more duct openings.

In order to improve the above mentioned interaction between the side walls and the member further, at least one side wall of the member is of convex design and the transverse walls of the chamber are of correspondingly concave design at least in the vicinity of the duct openings which are present therein.

In order to ensure correct movement and positioning of the member inside the chamber of the multiway valve, the corners between the transverse walls are preferably rounded with a defined radius and the member is correspondingly rounded, at least locally, with a diameter which is equal to or less than twice the said radius.

The invention furthermore relates to a method for actuating a multiway valve according to the invention with the aid of one or more magnetic fields, wherein one generates a magnetic field with at least one magnet-actuating assembly, in order to move the member, under the influence of the magnetic field into a position inside the chamber which opens or closes at least one duct opening. It is thus possible to generate a transverse or parallel magnetic field, so that the member is moved, under the influence of the magnetic field, into a position inside the chamber which allows at least one duct opening to be opened or closed off.

Preferably, the electromagnet is energized in such a manner that it attracts or repels the permanent magnet, the member closing off or opening at least one duct opening.

Preferably, the magnetic strength of the permanent magnet of the member is selected in such a manner that the latter, once it has been attracted by an energized electromagnet, maintains the resultant position inside the chamber when the electromagnet has been switched off due to the attraction between the permanent magnet and the pole shoes of the switched-off magnet. The member, by means of its permanent magnet, will attract the pole shoes of an electromagnet which is switched off, so that there is no need for an electromagnet to be permanently energized. All that is required to displace the member inside the chamber is for another magnet-actuating assembly to be briefly energized sufficiently to overcome the attraction force between the member and the first switched-off electromagnet. The member is then moved towards the energized electromagnet and, after the electromagnet is switched off, again maintains its position into which it has been moved by the said energized electromagnet until another electromagnet attracts the member as a result of being energized.

If it is desirable for the position of the member inside the chamber to be changed, the magnet-actuating assembly is advantageously energized with reversed polarity, so that the member reverses the opening or closure of the duct opening. By reversing the polarity, the electromagnet will be made to repel the member, so that the latter is driven out of its position in which it was originally positioned by the attracting energization.

Highly advantageously, various magnet-actuating assemblies of a multiway valve are energized simultaneously, in such a manner that one assembly attracts the member and the other assemblies repel the member. In the event of an actuation of this nature, the member is guided inside the chamber, as it were towards the desired position, due to the fact that the resultant force for displacing the member is intensified by the repelling magnetic fields. Furthermore, relatively weak energizing pulses are sufficient to displace the member from a certain position to another position inside the chamber of the multiway valve.

In order to achieve accurate actuation, it is advantageously possible to dispose a plurality of magnet-actuating assemblies in the multiway valve and to energize them in such a manner that they repel the permanent magnet, the positioning of the member being influenced by varying the magnetic field strength of one or more magnet-actuating assemblies. Due to the fact that all the magnet-actuating assemblies repel the member, the member will be moved towards the magnet-actuating assembly which is repelling the member the least. By changing the magnetic field strength of one or more of the magnet-actuating assemblies, the position of the member will be changed accordingly. However, in this embodiment it is necessary for the magnet-actuating assemblies in question to be energized continuously.

BRIEF DESCRIPTION OF THE DRAWINGS

The present invention will now be explained in more detail with reference to the drawings, in which:

FIG. 12 diagrammatically depicts an application of an embodiment of the shut-off valve according to the present invention.

FIG. 1 shows a highly simplified, diagrammatic illustration of a plan view of a chamber 90 in which a member 91, which is designed as an annular disc, is accommodated. A member cavity which is enclosed by the ring shape is denoted by 97. The parallel surface of the chamber which is situated beneath the disc includes four peripheral duct openings (93, 94, 95, 96) and a central duct opening (92), the central duct opening being in communication with one peripheral duct opening in every position of the member 91 while the other peripheral duct openings are closed off, (cf. FIGS. 1A, B, C and D; the duct openings which are closed off are illustrated as broken circles). The dead volume of the valve according to this embodiment is determined by cavity 97 which is delimited by the disc-like member 91. In this embodiment, the dead volume does not vary during operation of the multiway valve. For this reason, and due to the fact that the direction of movement of the member is at right angles to the ducts 92–96, the operation of this multiway valve is insensitive to any feed pressures through the ducts. This embodiment is therefore eminently suitable for use at high pressures, such as in the case of HPLC.

It is possible to connect the chamber 90 to ducts which open out into its side walls. Member 91 may, if desired, also close off or open the latter ducts. In principle, the number of central and peripheral duct openings in this embodiment is unlimited. The number of corners of the chamber may also be adapted as desired: the chamber may also be of round design. For considerations of clarity, the control means are not shown in this figure.

Figure 2:
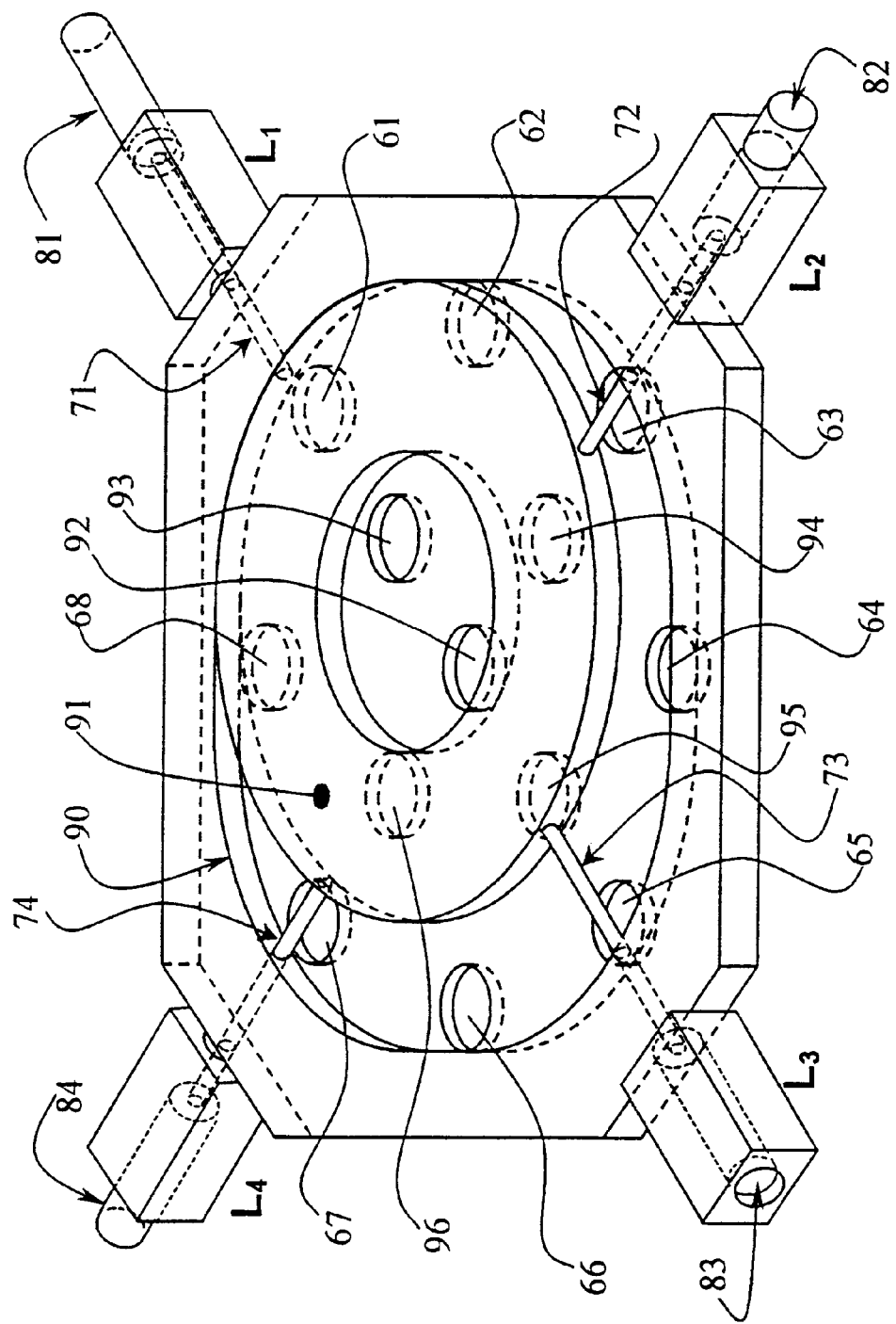
FIG. 2 shows a perspective view of a multiway valve according to the prior art, in which the member is connected to control means by direct coupling.

In FIG. 2, the multiway valve comprises, in addition to central duct opening 92 and the peripheral duct openings (93–96), duct openings 61–68 which likewise open out on the underside of the chamber, but which are situated in the vicinity of the side wall. Owing to the shape of the chamber and the member, these ducts cannot be placed in communication with the member cavity. Consequently, two closure circuits are defined, namely the central circuit, comprising the duct openings 92/96, and the peripheral circuit, comprising the duct openings 61–68. Obviously, it is also possible for the position of the duct openings 93–96 to be selected in such a manner that they may form part of both the peripheral circuit and the central circuit. Hollow disc 91 is connected, via push and pull rods 71–74, to control means L1, L2, L3 and L4, respectively, which each contain a magnet 81, 82, 83 and 84, respectively. Depending on the direction of the current passing through a coil situated in L1, L2, L3 and L4, respectively, the magnet in question is moved either towards the chamber or away from the chamber.

Figure 1:
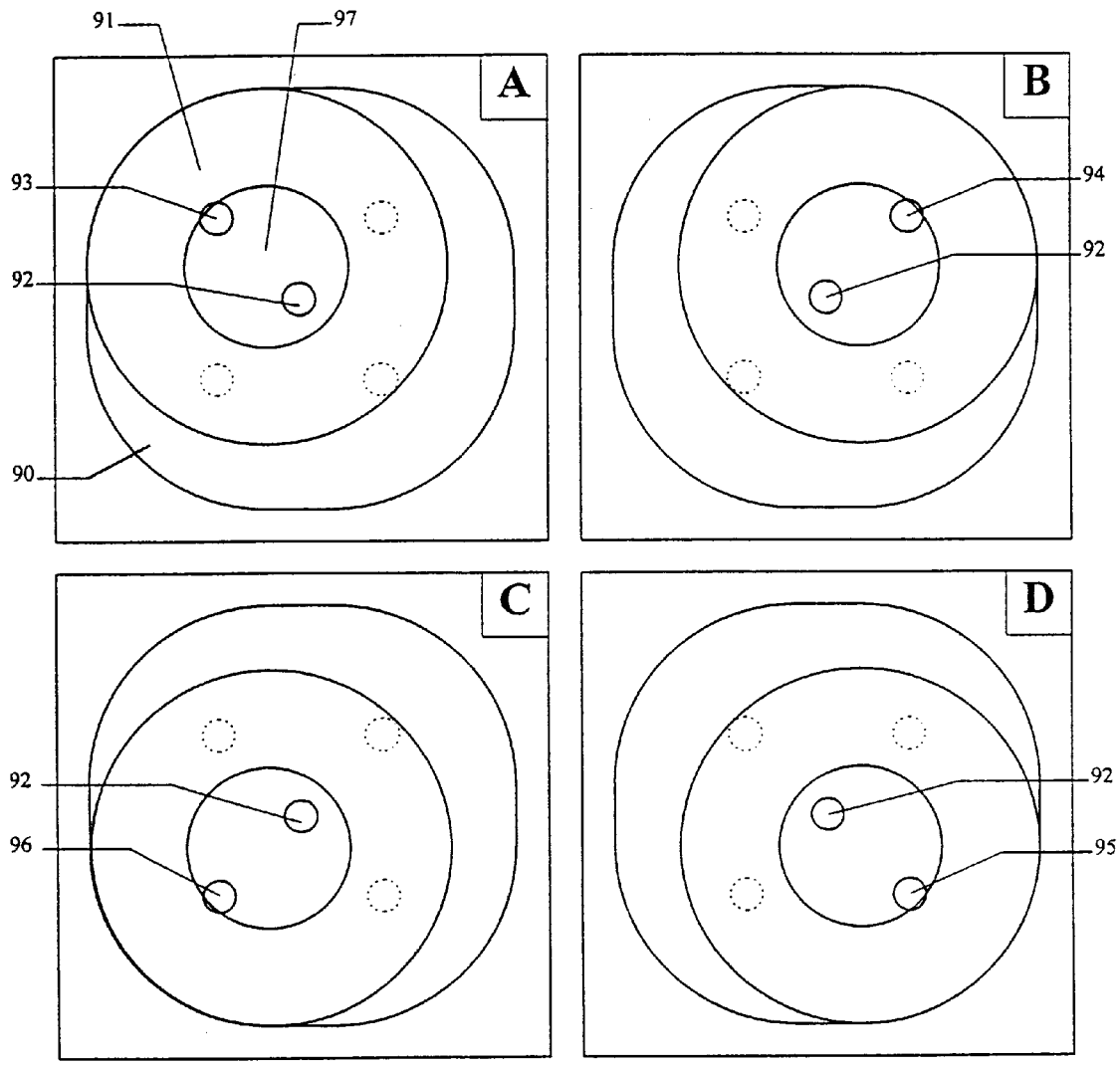
FIG. 1 shows a simplified, diagrammatic plan view of a chamber of an embodiment of the multiway shut-off valve according to the present invention, in which the member is designed as a hollow disc and in which five ducts open out into a bottom surface of the chamber, FIGS. 1A, B, C and D each showing different closure positions of the member.

In FIG. 3A1, a member 31, which is designed as a continuous disc, is situated in the vicinity of the centre of chamber 30. The control means are not shown in this cross-sectional view. A feed duct 32 opens out into chamber 30 via duct branches 32A and 32B. Via chamber 30, duct 32 is in communication with discharge duct 33. Duct 34 is closed off by member 31.

In FIG. 3A2, member 31 is situated in the far left of chamber 30, closing off feed duct branch 32A and discharge 34. Feed duct 32 is in communication with discharge duct 33 via duct branch 32B. FIG. 3B shows an embodiment of a member 310 in which a groove 311 is arranged tangentially in the outer circumference. A central feed 312, which via groove 311 is in communication with that part of the chamber which is not closed off by member 310, opens out in the side wall of chamber 313.

Figure 3:
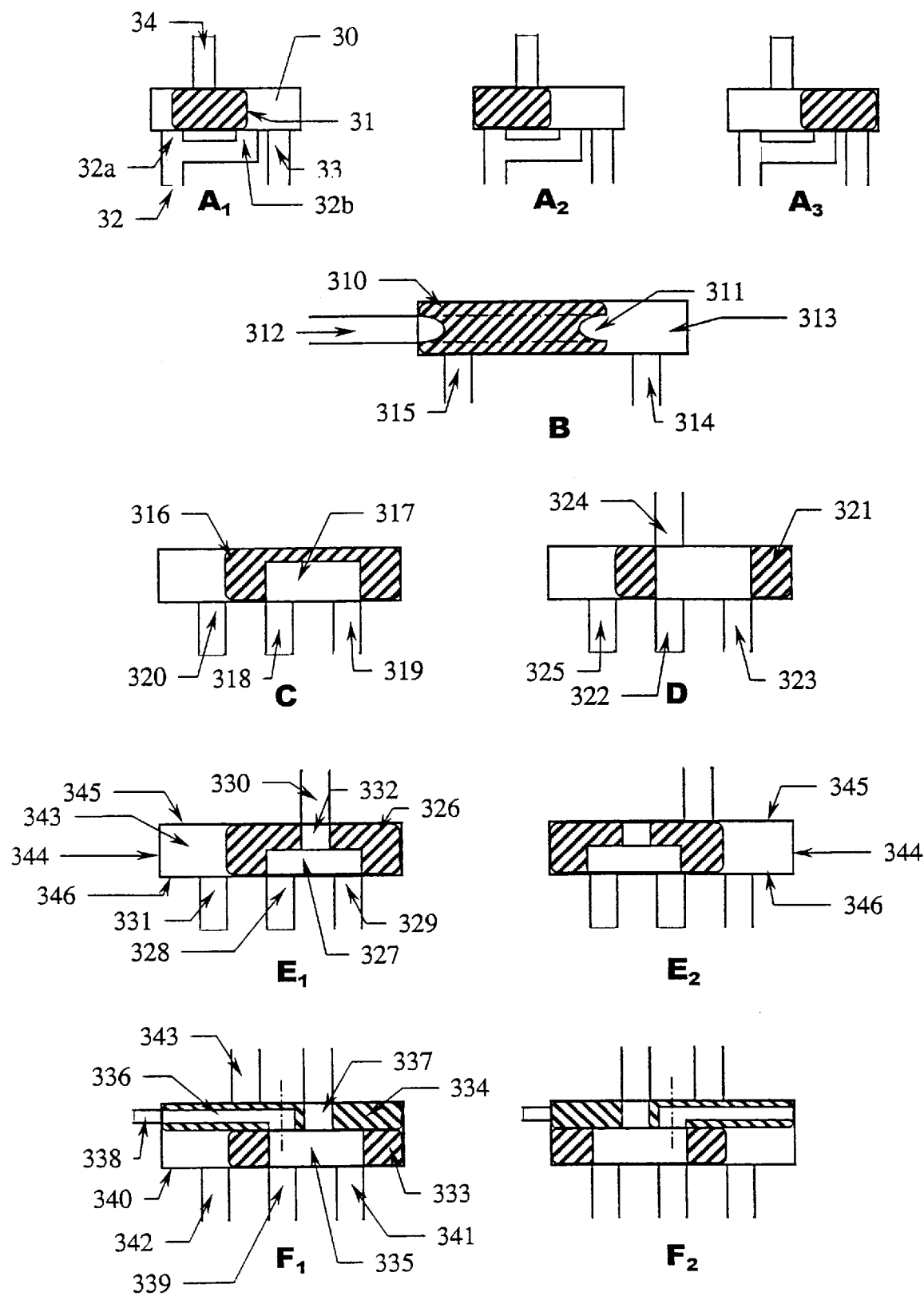
FIG. 3 shows simplified cross sections through various embodiments of the member and the relative position thereof inside the chamber.

In FIG. 3A3, member 31 is situated in the far right of the chamber, with the result that feed branch 32B and discharge duct 33 are closed off. Via duct branch 32A, the central feed 32 is in communication with discharge 34, the opening of which is situated in the opposite plane-parallel surface with respect to duct branch 32A. In order for the member to be correctly guided inside the walls, the side walls of the member may be of convex design and those of the chamber may be correspondingly concave.

Through groove 311, duct 312 is in communication with discharge duct 314. If member 310 is moved to the right, duct 314 will be closed off, so that the central feed duct will be placed in communication with duct 315.

In FIG. 3C, the member 316 comprises a cavity 317. Via cavity 317, feed duct 318 is in communication with discharge duct 319. By displacing member 316, discharge duct 319 can be closed off and duct 320 can be connected to duct 318.

In FIG, 3D, member 321 is designed as a hollow disc. In the position of the member which is illustrated, feed duct 322 is connected to discharge ducts 323 and 324. Duct 325 is closed off. By moving the member to the right, discharge duct 324 will also be closed off. When the member is moved to the left, discharge duct 323 will be closed off while duct 325 will be opened.

In FIG. 3E, member 326 comprises a member cavity 327 which is in communication with both the top and bottom sides of the chamber 343. In the position illustrated, duct 328 is connected to ducts 329 and 330, and duct 331 is closed off. By moving member 326, as illustrated in FIG. 3E2, ducts 329 and 330 are closed off and duct 328 is connected to duct 331. If ducts 329 and 331 are designed as discharge ducts, the side walls 344 of the chamber 343 can be omitted, provided that the top and bottom sides of the member 326 interact in a sealing manner with the plane-parallel top and bottom walls (345, 346) of the chamber (343).

In FIG. 3F, the member is composed of an annular disc on which a rotatable disc 334 is positioned. The side walls of the rotatable disc are for their part of convex design and that of the chamber at the location where it interacts with the disc is of correspondingly concave design, although this does not necessarily have to be the case. The member comprises member cavity 335. Discs 333 and 334 interact with one another in a sealing manner by means of surface-to-surface contact. Disc 333 can be moved in the length and width directions in the chamber, while disc 334 can only be rotated in the chamber. Disc 334 contains a continuous bore 336 and 337. In the case illustrated, a duct 338 arranged in the side wall of the chamber 340 is connected to the member cavities and therefore to ducts 339 and 341. Ducts 342 and 343 are closed off. In FIG. 3F2, disc 334 has been rotated through 1800 with respect to the situation shown in FIG. 3F1, so that duct 338 is closed off and duct 343 is in communication with the member cavity. Disc 333 is now in the left-hand position, with the result that duct 341 is closed off and ducts 342 and 339 are connected to one another and to duct 343 via the member cavity 335.

FIG. 3G shows a cross section through a valve according to the invention, with ducts positioned on either side of the plane of movement of the member. By varying the pressure of one or more of the ducts, the member 350 can be pressed against the top or bottom wall (356 and 357, respectively) of the chamber 355, thus ensuring the correct positioning of the member. In FIG. 3G1, the member 350 is pressed against the top wall 356, duct 351 which has a cross-sectional area A2 and a pressure P2 being closed off. Ducts 352, 353 and 354, in which pressures P1$a$, P1$b$ and P1$c$ respectively prevail and which ducts respectively have a cross-sectional area A1$a$, A1$b$ and A1$c$, are arranged on the opposite side with respect to the plane of movement of the member 350. In the case illustrated, the sum of the pressure exerted by the ducts 352, 353 and 354, each multiplied by the cross-sectional area thereof, $\Sigma(P1*A1)$ is greater than feed pressure P2 multiplied by A2 (P2*A2). As a result, a force will be exerted on member 350 in the direction towards top wall 356, with the result that the member will be prevented from moving within the chamber. Duct 352 is also closed off, while ducts 353 and 354 are connected to one another.

If $\Sigma(P1*A1)$ is equal to P2 multiplied by A2, member 352 is not pressed against either the top wall 356 or the bottom wall 357 of chamber 355, so that movement of the member is not impeded, cf. FIG. 3H.

Movement of the member may also be impeded if P2 multiplied by A2 is greater than $\Sigma(P1*A1)$, with the result that member 350 is pressed against the bottom wall 357 of chamber 355, cf. FIG. 3I.

In FIGS. 3G, 3H and 3I, the cross-sectional area of duct 351 is varied; however, it will be clear to the person skilled in the art that it is also possible to change the cross-sectional area of one or more other ducts and/or the feed pressure in one or more ducts. With this embodiment, it is possible to improve control of the lateral movement of member 350 in chamber 355 by varying feed pressures.

Figure 4A:
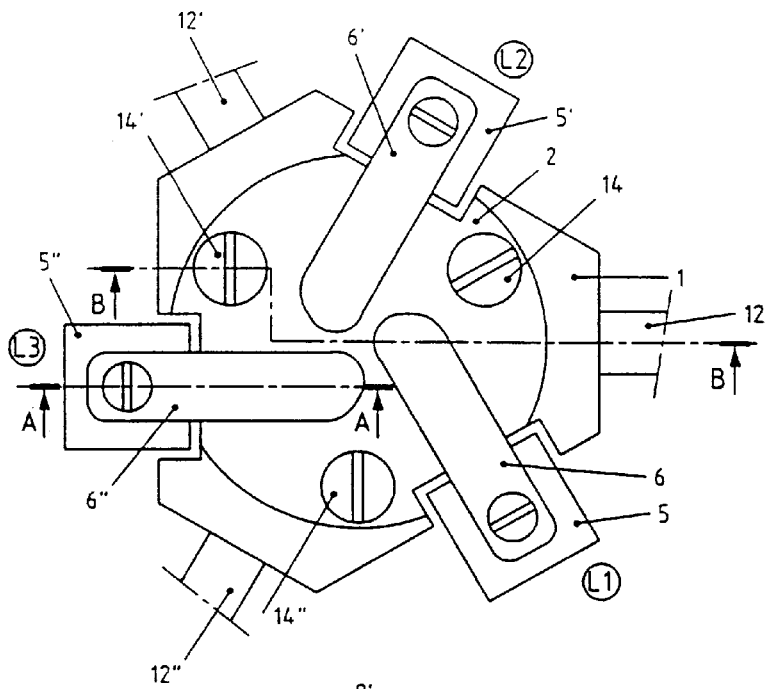
FIG. 4 shows an embodiment of the multiway valve according to the present invention in which the valve comprises magnet-actuating assemblies for generating a transverse magnetic field.
Figure 4B:
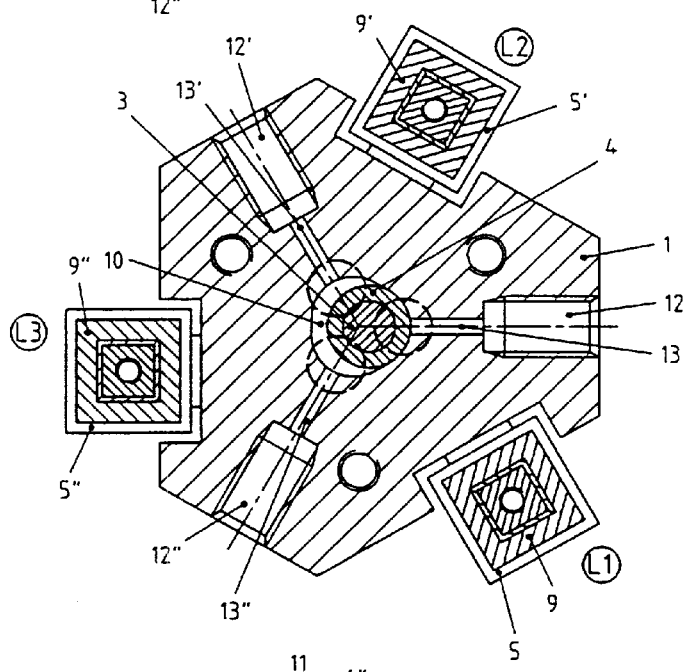
Figure 4C:
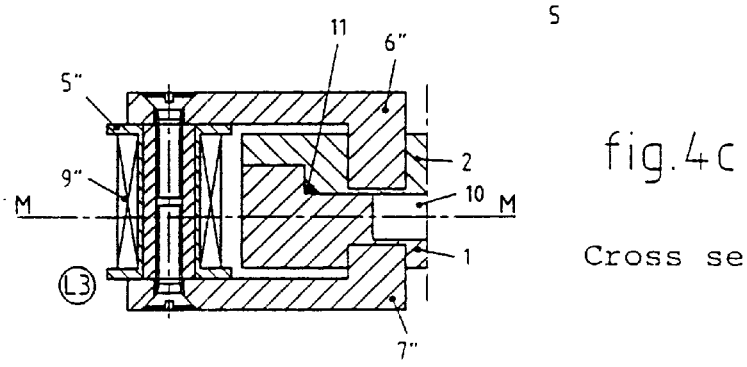

FIG. 4 illustrates the method for positioning a member by means of magnet-actuating assemblies with the aid of a transverse magnetic field. Although the method can be carried out for, for example, eight magnet-actuating assemblies, it has been decided here, for the sake of clarity, to explain this method with reference to a preferred radial three-way valve. In the plan view of FIG. 4A, the multiway valve comprises a housing 1 made of a non-magnetizable material, such as stainless steel or plastic. A cover 2, which is likewise made from a non-magnetizable material, is mounted on the housing by means of screws 14. The multiway valve is connected to ducts 12, 12', 12" for feeding and discharging a medium. Three magnet-actuating assemblies 5, 5', 5" are disposed around the housing, a pole shoe 6, 6', 6", respectively, of each of these assemblies extending above the housing as far as close to the centre thereof. The multiway valve is illustrated further in the longitudinal section shown in FIG. 5, in which a chamber 10 is situated in the centre of the housing 1. An annular member 4, in which a permanent magnet 3 is concentrically accommodated, is situated in the chamber. The shape of the chamber 10 substantially corresponds to a triangle, the corners being rounded with a radius which is equal to half the diameter of the member 4. Via narrowed section 13, 13' and 13", ducts 12, 12', 12", respectively, open out into chamber 10. The ducts which open out into the plane-parallel surfaces are not shown for the sake of clarity. The magnet assemblies 5, 5' and 5" comprise windings 9, 9', 9", respectively. The ends of the pole shoes of the electromagnet assemblies 5, 5' and 5" are indicated by broken circles, but they are situated above and below the plane illustrated; they are shown more clearly below in the cross sections shown in FIGS. 4B and 4C. In the position shown, the member 4 closes off the opening of duct 12. The openings of ducts 12' and 12" are in communication with one another via chamber 10. The volume inside the chamber which is not taken up by the member (the so-called dead volume) is very low in the case illustrated. If desired, the dimensions of the chamber may be selected to be larger.

FIG. 4C shows a cross-sectional view through magnet-actuating assembly 5", pole shoes 6" and 7" being respectively mounted above and below the chamber, the centre axis of both pole shoes running just next to the magnetic centre of the member 4 and between the said magnetic centre and the opening of duct 12. The height of the chamber 10 corresponds to the thickness of member 4, so that the member is just able to move freely in the chamber. In order to provide an optimum seal for the chamber 10, an O-ring 11 is accommodated between the housing 1 and the cover 2. The distance of the pole shoes 6" and 7" from the centre longitudinal plane M and to the centre of the chamber is in each case equal. In principle, the structures of the magnet-actuating assemblies 5 and 51 are identical to that of 5".

Figure 5A:
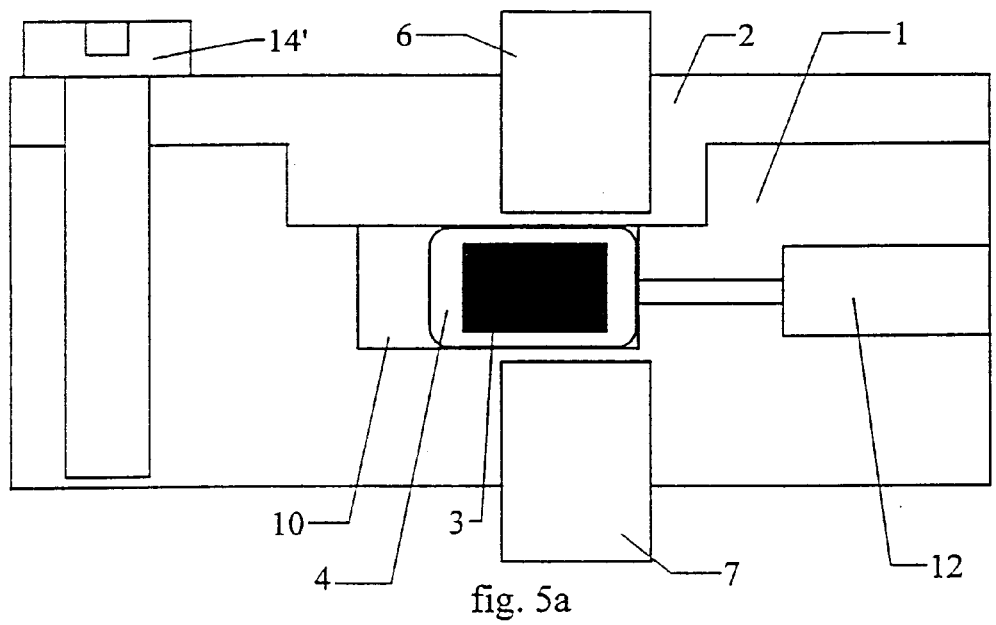
FIG. 5 shows a simplified view of the cross section in accordance with FIG. 4, in which the forces are illustrated as vectors.
Figure 5B:
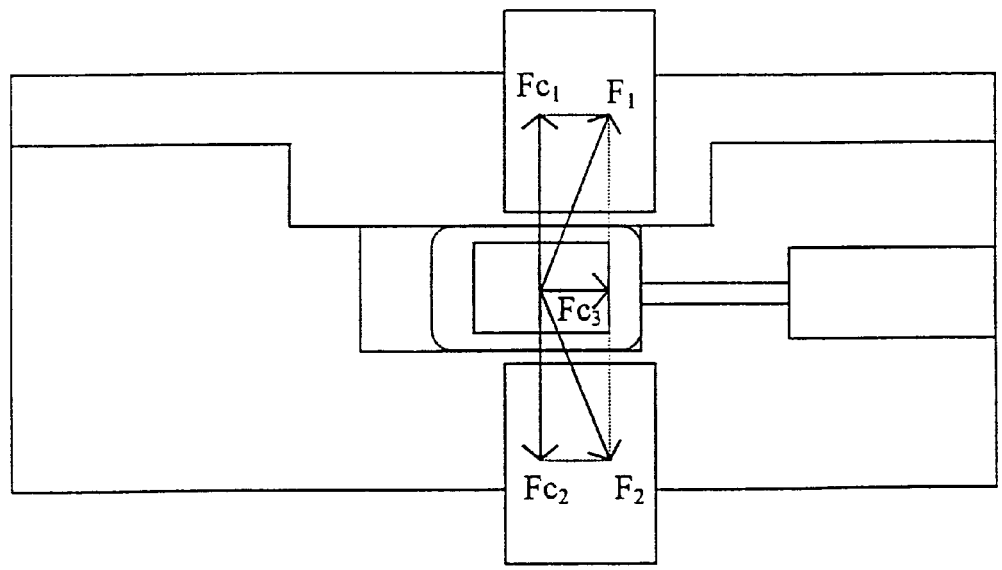

The action of the multiway valve can be explained in more detail with reference to FIGS. 5$a$ and 5$b$ which show a cross section on line B in FIG. 4$a$1. Since the axial distance from the pole shoe 6 to magnet 3, i.e. the magnetic centre of member 4, is equal to the axial distance from pole shoe 7 to the magnet 3, the axial force $Fc_1$ of magnet 3 on pole shoe 6 is equal and opposite to the axial force $Fc_2$ of magnet 3 on pole shoe 7; the sum of the two axial forces $Fc_1$ and $Fc_2$ is 0 and the resultant $Fc_3$ of the attraction force of the magnet 3 on the pole shoes 6 and 7 ($F_1$ and $F_2$, respectively) is radial in the direction of the wall of the chamber. The duct 12 is closed by the action of magnet 3 on pole shoes 6 and 7. When the magnet-actuating assembly is energized, comparable forces will likewise be generated, albeit as a result of the magnetic field of the energized electromagnet acting on the magnetizable material or the permanent magnet 3 of the member. By then energizing the magnet-actuating assembly 5 in such a manner that the field lines run in the opposite direction to those of the permanent magnet 3, forces $F_1$ and $F_2$ will have a resultant directed towards the interior of the chamber. As a result, member 4 will be repelled from the position shown in FIG. 4, with the result that the member will be driven out of the position illustrated. If magnet-actuating assembly 5", for example, is now energized in such a manner that the field lines between the pole shoes 6" and 7" run in the same direction as those of the permanent magnet 3, the member 4 is attracted by assembly 5' and adopts a position inside chamber 10 closing off duct 12'. This situation is comparable to that which is illustrated in FIG. 4 for duct 12. The energizing provided by magnet assembly 5 (and if appropriate also by assembly 5") repelling the member and the energizing of magnet assembly 5' which attracts the member can be turned off as soon as the member is situated in the position in which it closes off the duct 12". After the energizing of the magnet assemblies 5, 5' and, if appropriate, 5" has been switched off, member 4 maintains its adopted position owing to the force attracting magnet 3 to the two pole shoes 6' and 7'. If member 4 comprises magnetizable material instead of a permanent magnet, at least the magnet assembly which in the case shown, holds the member in a duct-closing position (for example magnet-actuating assembly 5 with pole shoes 6 and 7 for closing off duct 12, as shown in FIG. 4) must remain in the energized state for as long as closure of the duct in question is desired.

Figure 6:
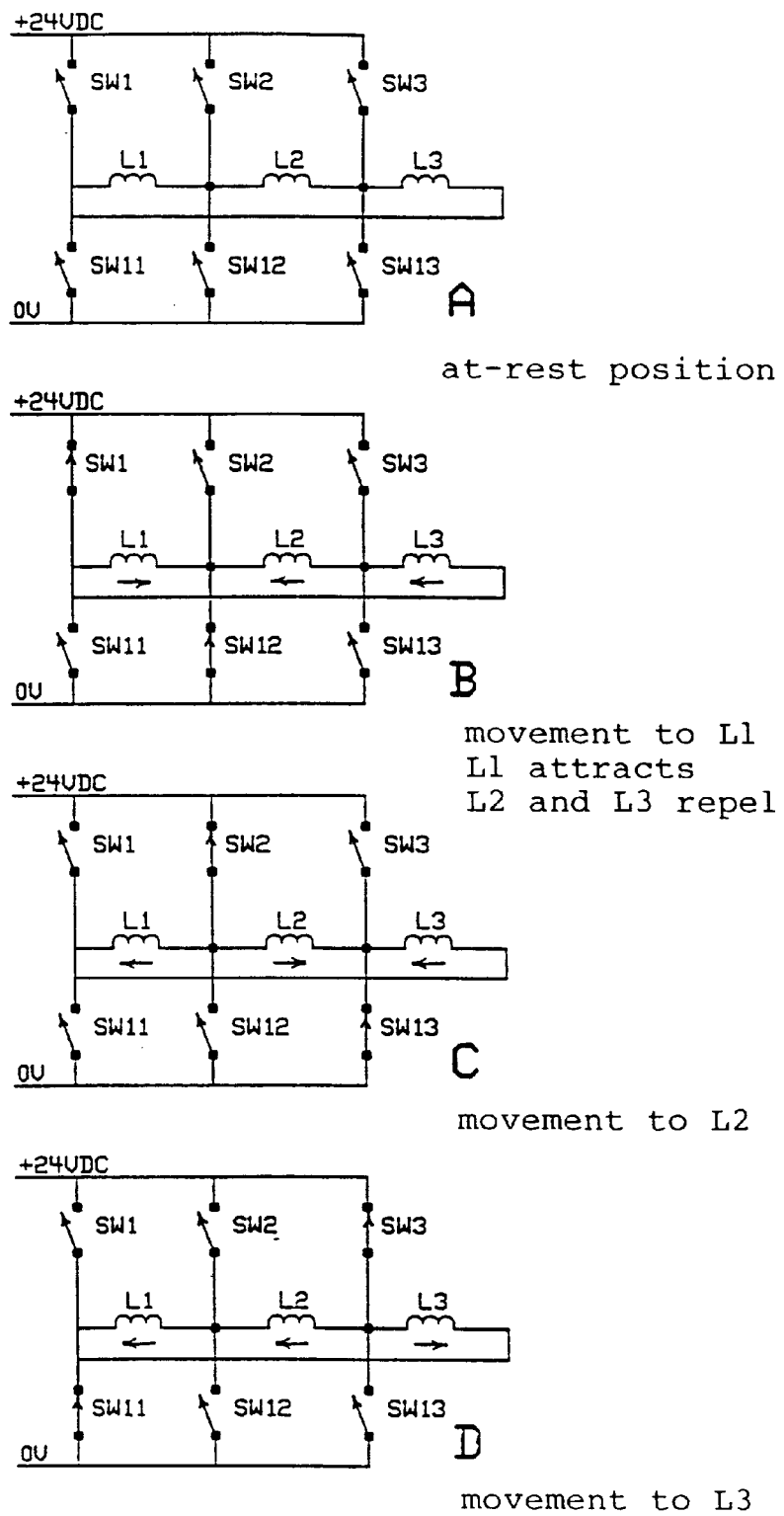
FIG. 6 shows a possible circuit diagram for actuating the multiway valve in accordance with FIG. 4.

FIG. 6 shows a circuit diagram for actuating the multiway valve shown in the preceding figures, and it should be noted that L1, L2 and L3 refer to magnet assemblies 5, 5' and 5", respectively, and that the windings 9, 9' and 9" are wound in identical directions. If none of the magnet assemblies is energized, as shown in FIG. 6A, the multiway valve is situated in an at-rest position in which the member is not being attracted by any of the electromagnets. If the member comprises a permanent magnet, the member will retain the position brought about by the most recent energizing of one of the electromagnets. By means of the circuit shown in FIG. 6B, the electromagnets of the magnet-actuating assemblies are energized in such a manner that assembly 5 attracts the member 4 and the assemblies 5' and 5" repel the member. FIG. 6C shows a circuit in which the electromagnets of the magnet-actuating assemblies are energized in such a manner that assemblies 5 and 5" repel the member 4 and assembly 5' attracts the member. Similarly, magnet assemblies 5 and 5' will repel the member and assembly 5" will attract the member if the electromagnets are energized in accordance with the circuit shown in FIG. 6D. Obviously, this circuit can easily be adapted for control with 4 or more magnet assemblies.

Figure 7A:
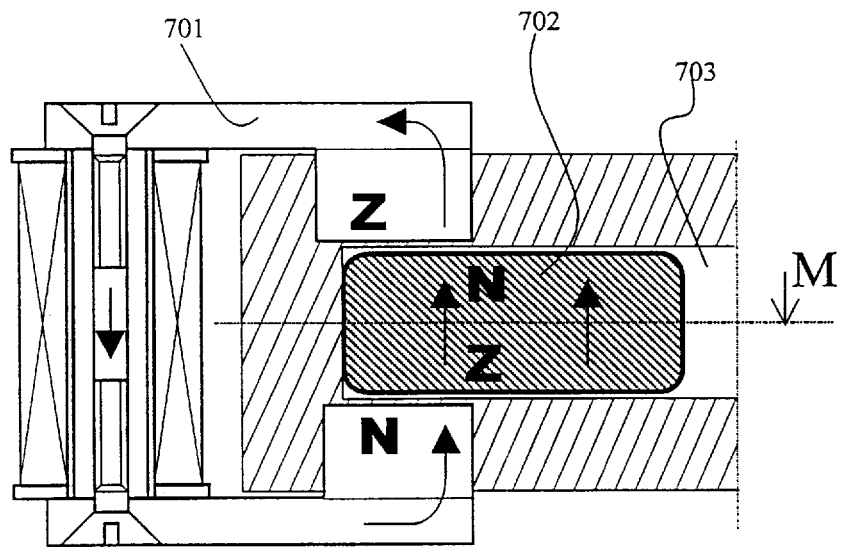
FIG. 7 shows possible magnet assemblies for generating a transverse magnetic field and a parallel magnetic field.

FIG. 7a shows a magnet assembly 701 which generates a magnetic field whose field lines run transversely to the direction of movement of a member 702 in chamber 703. Member 702 comprises an axially polarized permanent magnet, the north and south poles of which are denoted by "N" and "Z". M indicates the centre longitudinal plane of the chamber.

Figure 7B:
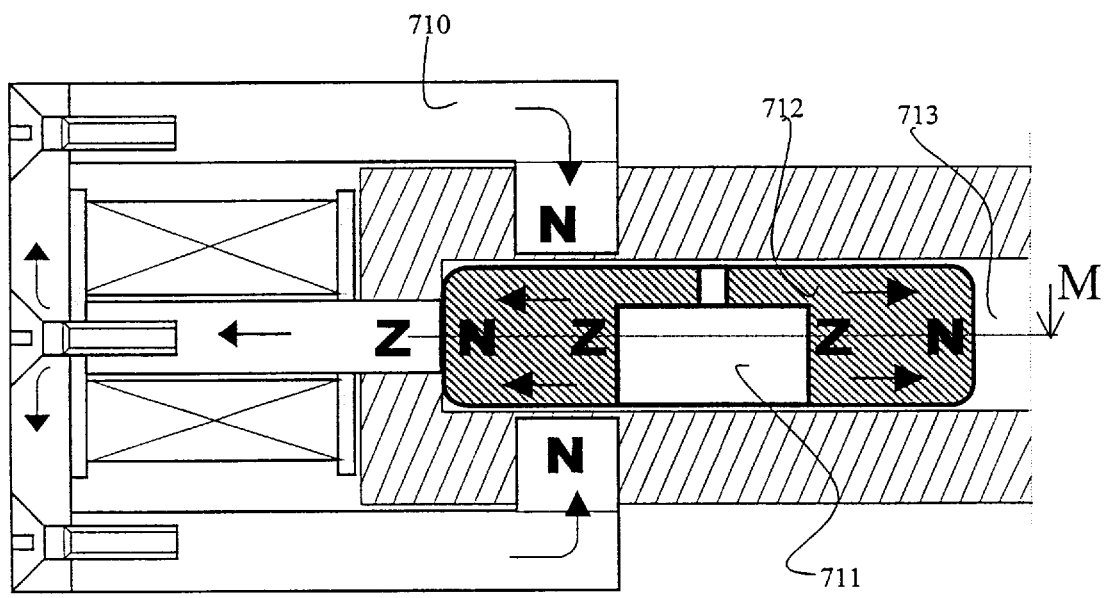

FIG. 7b shows the path of magnetic field lines as in FIG. 7a; in this case, a magnet-actuating assembly 710 generates a magnetic field whose field lines run parallel to the direction of movement of a member 712 in chamber 713. Member 702 comprises a permanent radially polarized magnet, the north and south poles of which are denoted by "N" and "Z". In the case illustrated, member 712 comprises a member cavity 711.

Figure 8:
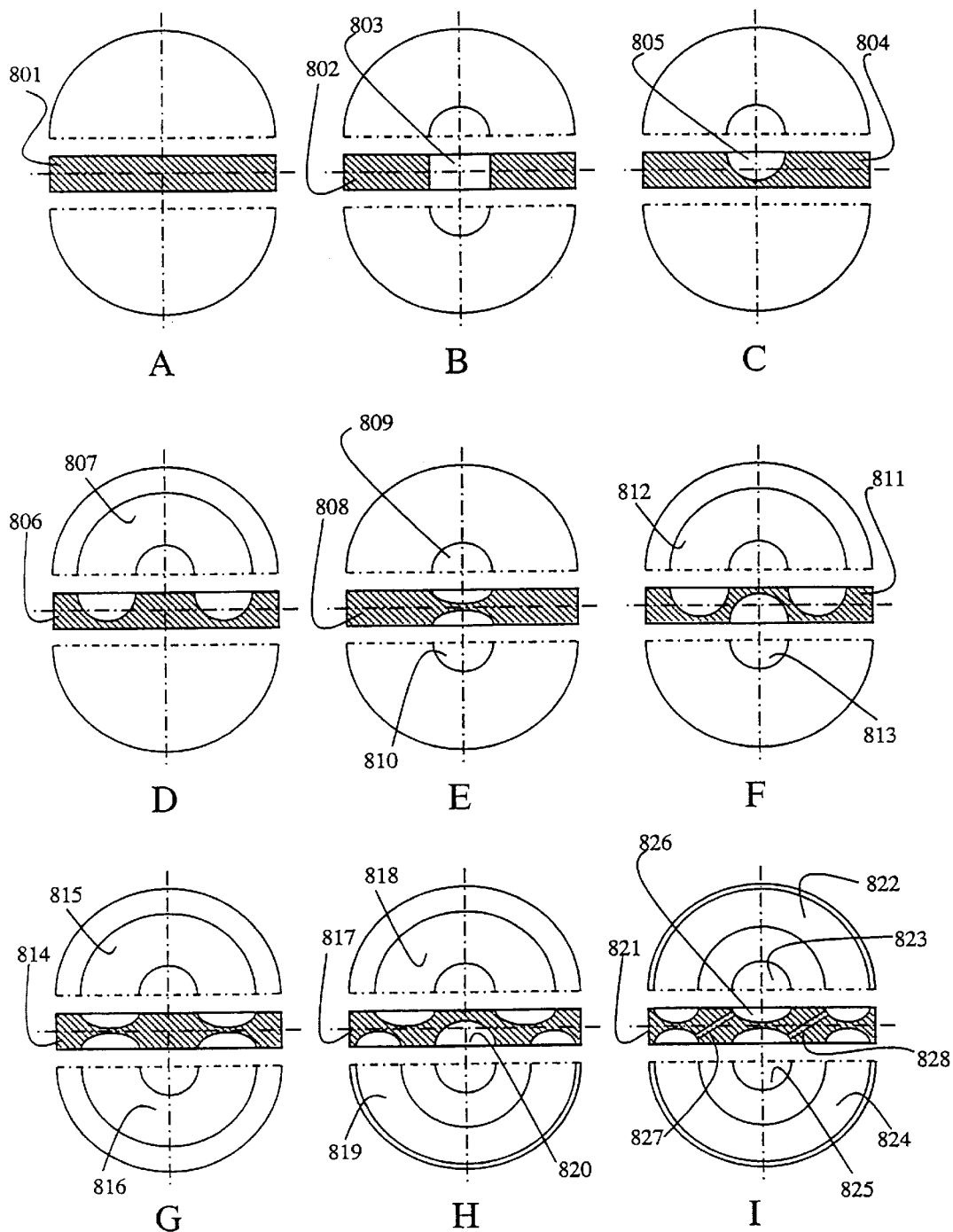
FIG. 8 shows various embodiments of the member, each part of the figure showing half a plan view, a cross section and half a bottom view. That half of the views which is not shown is in each case identical to the half which is shown.

FIG. 8 shows a number of possible embodiments of a disc-like member for a multiway valve according to the present invention. Depending on the desired number of possible connections for the multiway valve, the member may have one or more cavities of identical or different forms. In FIG. 8A, a member 801 is designed as a continuous disc, while in FIG. 8B a disc-like member 802 contains a member cavity 803 which is designed as a continuous opening. In FIG. 8 member 804 contains a member cavity 805 which is designed as a hollow which is not continuous. FIG. 8D shows a member 806 with a member cavity 807 which is designed as a circular hollow arranged on one side. Member 808 contains two member cavities 809 and 810 which are not in communication with one another and are arranged on either side of the member 808. In FIG. 8F, member 811 contains member cavities 812 and 813, i.e. a combination of the member cavities shown in 8C and 8D. FIG. 8G shows a member 814 with two circular member cavities 815 and 816, which are arranged on either side and opposite one another on the member. Member 817 in FIG. 8H contains two circular member cavities 818 and 819 of different diameters which are arranged on either side of the member. Moreover, there is a cavity 820 which is designed as a central hollow. In FIG. 8I, member 821 contains two circular member cavities 822 and 823 which are respectively connected to member cavity 825 and 826, via passages 828 and 827, respectively.

Figure 9:
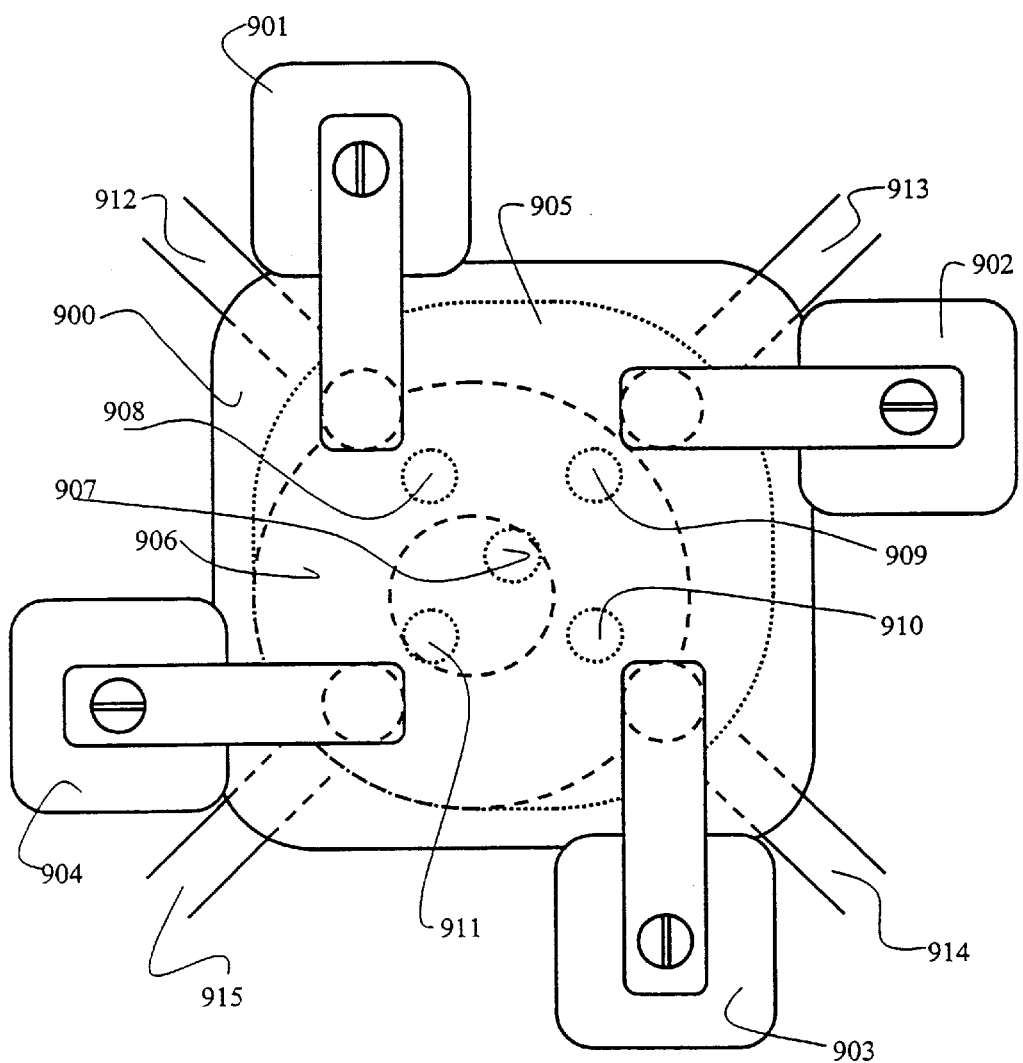
FIG. 9 shows a possible combination of the axial ducts from FIG. 1 and the radial ducts for FIG. 4.

FIG. 9 shows a multiway valve 900 which is provided with four electromagnets 901–904 in accordance with FIG. 7a, each for generating a transverse magnetic field through a chamber 905 in which a member 906, which is designed as an open disc, is accommodated, as described in FIG. 1. In the case shown, a central duct is denoted by 907 and peripheral ducts are denoted by 908–911. Moreover, lines 912–915 which can be closed off by the member 906 are arranged in the side walls of the chamber, in the vicinity of the electromagnets 901–904. In the case illustrated, member 906 is situated in the vicinity of electromagnet 904, closing off ducts 908, 909, 910 and 915. Central duct 907 is in communication with duct 911 and ducts 912, 913 and 914 are in communication with one another via chamber 905.

FIG. 9 diagrammatically depicts a valve which is able to control a combination of radial ducts and axial ducts in two separate circuits. Naturally, it is also possible for the duct openings to be designed, for example, as optionally tapering slots, so that partial sealing of a slot of this nature by the member allows very accurate metering and/or combined openings.

Figure 10:
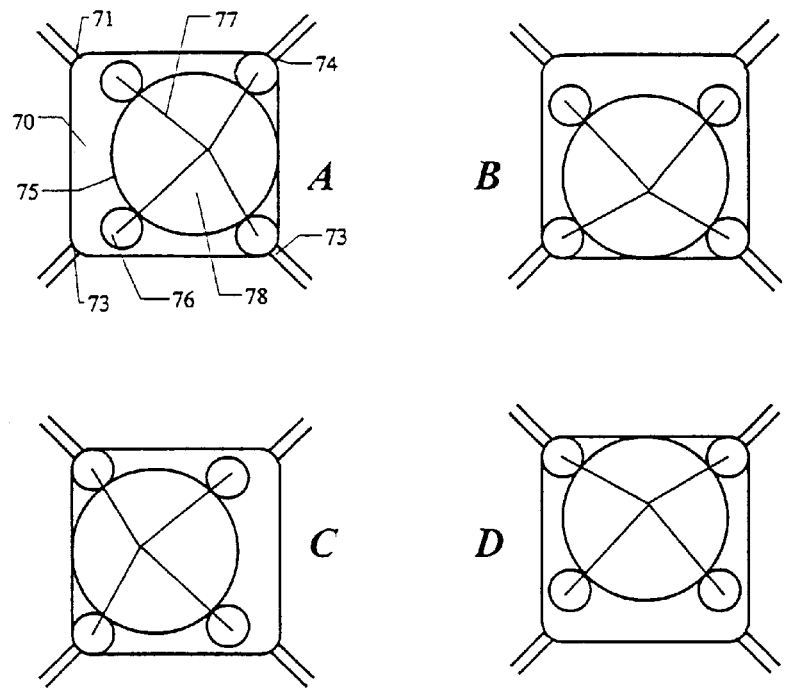
FIGS. 10 and 11 show simplified, diagrammatic plan views of two further embodiments of the multiway valve according to the present invention.

In FIG. 10, a multiway valve comprises a chamber 70 which is of substantially square design and in which the corners of the side walls are rounded. Ducts (71–74) open out into each corner of the chamber. A member 75 which comprises a disc-like body 78 and form satellite bodies 76 which and connected to disc-like body 78 by means of elastic connections 77 is accommodated in the chamber. For optimum sealing purposes, the surface of the satellite bodies advantageously comprises an elastic material, such as rubber or Teflon, and the radius of the satellite bodies preferably corresponds to the radius of the rounded corners of the side walls of the chamber. Positioning the member as shown in FIG. 10A opens ducts 71 and 72 and closes off ducts 73 and 74.

FIGS. 10B and D show other positions of the member 75 inside the chamber 70.

Figure 11:
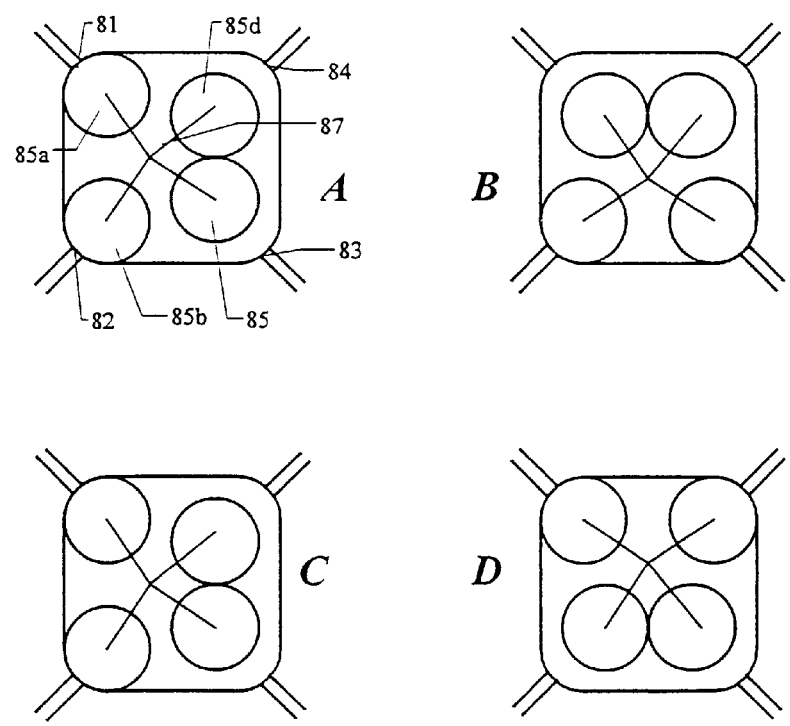

In FIG. 11, the member 85 comprises four disc-like closure bodies 85A–D which are coupled via elastic connections 87, and ducts 81–84. In FIG. 11A, ducts 81 and 82 are closed off by closure bodies 85A and 85B, respectively. FIGS. 11B and 11C show other possible positions of the member 85 inside the chamber. The closure bodies may each comprise a magnetizable or magnetic material which can be controlled using magnet-actuating assemblies (not shown) as shown, for example, in FIG. 7.

FIG. 12 shows an application of an embodiment of the present invention. FIG. 12.1 shows a rudimentary circuit diagram for the bidirectional control of two cylinders X and Y in which A is the feed of the medium (oil or air) and B is the discharge. The switches I and II are both bipolar and have three positions. The points 1, 2, 3 and 4 are connected to the cylinders. FIG. 12.2 shows the equivalent of the switches in FIG. 12.1, while FIG. 12.3 shows the equivalent of FIG. 12.1 with switch II in the centre position. Similarly, it is possible to position the member in the chamber for any combination of the switches I and II from FIG. 12.1, with the exception of total closure of duct B.

Figure 13:
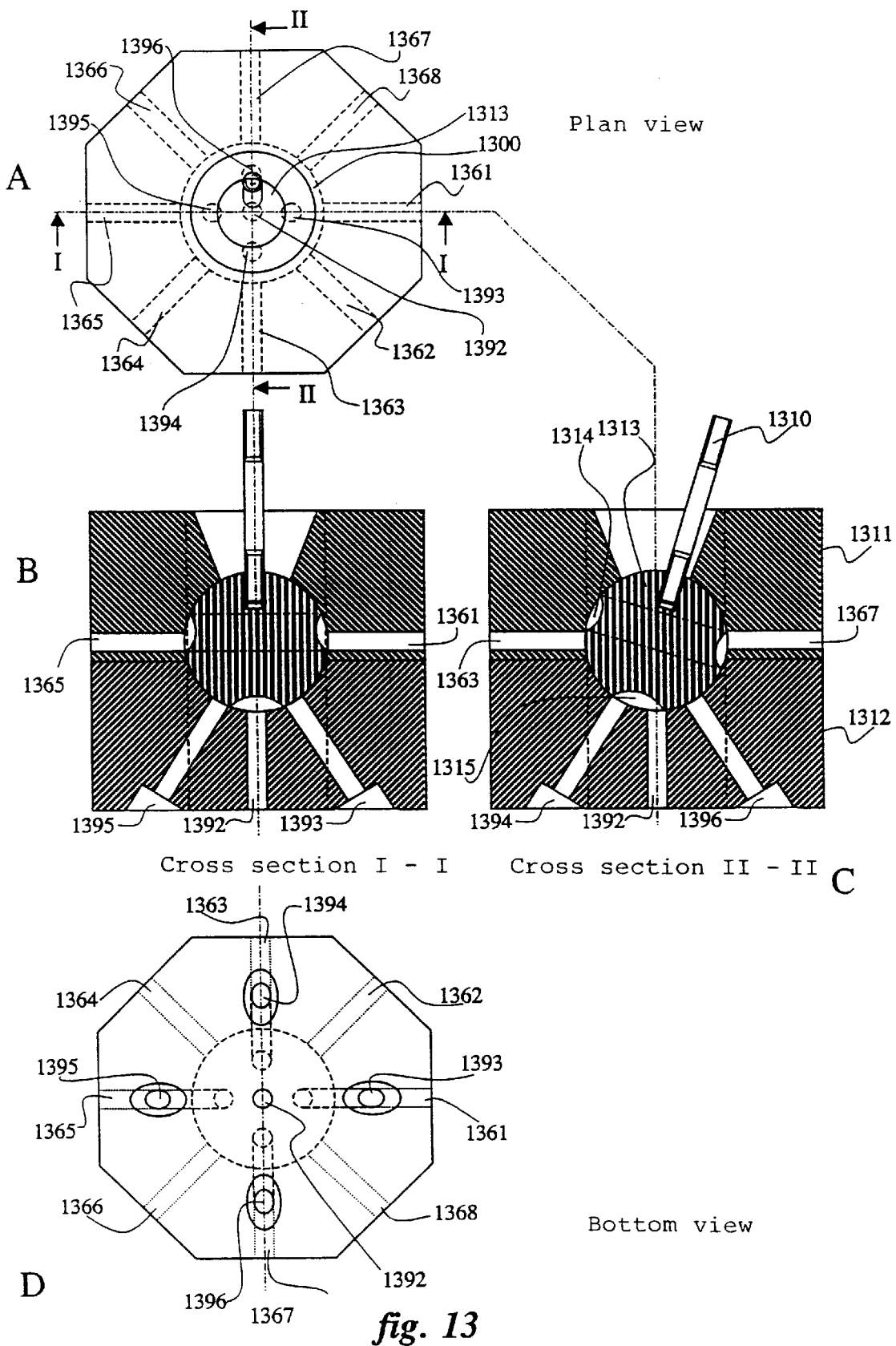
FIG. 13 shows a plan view, two cross sections and a bottom view of an embodiment of the multiway valve according to the invention in which the member and the chamber are of convex design.

FIG. 13a shows a plan view of a multiway valve according to the present invention which comprises a round chamber 1301 in which a member 1313 is accommodated. Member 1313 is connected to a joystick-like component 1310, it being possible for the member 1313, in the case illustrated, to be tilted inside the chamber through plane II—II and to be rotated. The joystick-like component 1310 may be connected to a control device, but may be also designed for manual operation. Member 1313 is provided with member cavities 1315 and 1314, member cavity 1314 being designed as an annular recess running over the circumference of member 1313. Thirteen ducts, ducts 1361–1368 of which are shown in FIG. 13a and ducts 1392–1394 of which are shown in the bottom view shown in FIG. 13d, open out into the chamber. In the position of the multiway valve which is illustrated in FIG. 13b, which is a cross section on line I—I from FIG. 13a, ducts 1361–1368 are connected to one another via the annular member cavity 1314. Ducts 1393 and 1395 are closed off. In the cross section on line II—II in FIG. 13a, which is shown in FIG. 13c, it can be seen that duct 1392 is connected to duct 1394 and that duct 1367 is in communication with member cavity 1314, i.e. duct 1367 is in communication with the ducts 1361 and 1365 of FIG. 13b. In this position, ducts 1368 and 1366 are likewise connected to ducts 1367, 1361 and 1365 via member cavity 1314. In this position, duct 1363 is closed off, as is 1396.

The member can be moved in two directions of movement which are perpendicular to one another, i.e. it can be tilted in the plane of cross section II—II and can be rotated about the axis of the joystick-like member 1310. "Directions of movement perpendicular with respect to one another" are understood to mean all directions of movement which can be put together from two mutually perpendicular movement vectors whose magnitude can be selected as desired.

It is also possible for the member 1313 to be designed so that it can be tilted in the common plane of the axes of ducts 1361–1365. The member can then be moved in three dimensions inside the chamber, resulting in even more possible combinations with regard to closing off and opening various ducts. obviously, the valve may be designed in such a manner that the member can be moved in two of the three dimensions mentioned above.

The multiway valve has a very large number of conceivable applications in measurement and control engineering for hydraulics and pneumatics, but also as a flow regulator, such as for regulating, mixing and metering pigments and solvents in the paints industry, addressing valve in analytical chemistry, such as for HPLC, or for regulating and/or mixing bulk materials, such as compound feed. Since the valve can be of completely closed design, there are also numerous possible applications for hazardous substances such as the petrol/air mixture in internal-combustion engines, natural gas or nuclear reactor coolant. Due to the possibility of simultaneous proportional regulation of various streams, this valve may, for example, be directly coupled at the position of a joystick at the position of a manipulator.

What is claimed is:

1. Multiway valve, comprising a chamber being delimited by at least two substantially plane-parallel surfaces, into which at least three feed or discharge ducts open out, each duct having an open state and a closed state effected by the positioning of a member accommodated inside the chamber in such a manner that the member is moveable in two dimensions in a plane which runs parallel to the plane-parallel surfaces, the member being flattened on two sides, the said flat sides of the member interacting in a sealing manner with the plane-parallel surfaces by means of surface contact, and the member can be made to interact in a sealing manner with one or more duct openings, and control means for moving the member inside the housing, wherein the member comprises a permanent magnet and the control means comprise a plurality of magnet-actuating assemblies which are disposed stationarily around the chamber and comprise electromagnets with a soft iron core, the magnet-actuating assemblies being designed to generate a magnetic field which attracts or repels the member.

2. Multiway valve according to claim 1, wherein at least one magnet-actuating assembly has two pole shoes having a centre axis and wherein the at least one magnet-actuating assembly is disposed in such a manner that the centre axis of two of the pole shoes thereof is positioned at right angles with respect to a centre longitudinal plane (M) of the chamber, the distance between each of the two pole shoes and the said centre longitudinal plane (M) being equal.

3. Multiway valve according claim 2, wherein the centre axis of the two pole shoes of the said magnet-actuating assembly runs inside the chamber, the distance therefrom to the closest transverse wall of the chamber being at maximum equal to the shortest distance from the magnetic centre of the member to the said transverse wall.

4. Multiway valve according to claim 1, wherein the field lines of the said permanent magnet run substantially radially with respect to the plane of movement of the member, and the magnet-actuating assemblies are designed to generate a magnetic field whose field lines run substantially parallel with respect to the said plane of movement.

5. Multiway valve according to claim 1, wherein the field lines of the said permanent magnet run substantially axially with respect to the plane of movement of the member, and the magnet-actuating assemblies are designed to generate a magnetic field whose field lines are substantially transverse with respect to the said plane of movement.

6. Multiway valve according to claim 1, wherein the member comprises a cavity which is delimited by at least one wall of the housing, into which wall the opening of at least one central duct opens out, the opening of the at least one central duct is in communication with the member cavity irrespective of the position of the member in the chamber.

7. Multiway valve according to claim 6, wherein the member comprises a continuous ring section which interacts in a sealing manner with at least one of the walls of the chamber, the member cavity being delimited in the radial direction by the inner circumference of the ring section.

8. Multiway valve according to claim 6, wherein the member cavity is delimited by two walls of the chamber which are situated on either side of the plane of movement.

9. Multiway valve according to claim 6, wherein the central duct can be placed in communication, via the member cavity, with at least one of the other ducts which open out into the chamber.

10. Multiway valve according to claim 1, wherein the chamber comprises at least one transverse wall which is positioned substantially transversely with respect to the plane of movement of the member, into which transverse wall at least one feed or discharge duct opens out.

11. Multiway valve according to claim 1, wherein at least four feed or discharge ducts open out into the chamber, wherein at least three ducts each have an open state and a closed state effected by the positioning of the member.

12. Method for actuating a multiway valve comprising a chamber being delimited by at least two substantially plane-parallel surfaces, into which at least three feed or discharge ducts open out, each duct having an open state and a closed state effected by the positioning of a member accommodated inside the chamber in such a manner that the member is moveable in two dimensions in a plane which runs parallel to the plane-parallel surfaces, the member being flattened on two sides, the said flat sides of the member interacting in a sealing manner with the plane-parallel surfaces by means of surface contact, and the member can be made to interact in a sealing manner with one or more duct openings, and control means for moving the member inside the housing, wherein the member comprises a permanent magnet having magnetic field lines and the control means comprise a plurality of magnet-actuating assemblies which are disposed stationarily around the chamber and comprise electromagnets with a soft iron core, the magnet-actuating assemblies being designed to generate a magnetic field which attracts or repels the member, said method comprising the step of generating with at least one magnet-actuating assembly a magnetic field having field lines that run parallel to the field lines of the member so as to cause the member to move under the influence of the magnetic field into a position inside the chamber resulting in opening or closure of at least one duct opening.

13. Method according to claim 12, wherein an electromagnet is accommodated in the magnet-actuating assembly and is energized in such a manner that it attracts or repels the permanent magnet of the member, the member closing or opening at least one of the ducts which open out into the chamber.

14. Method according to claim 13, wherein the magnetic strength of the permanent magnet of the member is selected in such a manner that the latter, once it has been attracted by an energized electromagnet, maintains the resultant position inside the chamber when the electromagnet has been switched off due to the attraction between the permanent magnet and one or more pole shoes of the switched-off magnet.

15. Method according to claim 13, wherein the magnet-actuating assembly is energized with reversed polarity, so that the member reverses the opening or closure of the duct opening.

16. Method according to claim 12, wherein various magnet-actuating assemblies of a multiway valve are energized simultaneously, in such a manner that one assembly attracts the member and the other assemblies repel the member.

17. Method according to claim 12, wherein a plurality of electromagnets are accommodated in the magnet-actuating assembly and these electromagnets are energized in such a manner that they repel the permanent magnet, the positioning of the member being influenced by varying the magnetic field strength of one or more magnet-actuating assemblies.

* * * * *